United States Patent [19]

Honda et al.

[11] Patent Number: 4,951,310
[45] Date of Patent: Aug. 21, 1990

[54] AUTOMATIC CALL DISTRIBUTION SYSTEM

[75] Inventors: Yosuke Honda; Takako Akazawa, both of Yokohama, Japan

[73] Assignee: Fujitsu Limited, Kawasaki, Japan

[21] Appl. No.: 352,501

[22] Filed: May 16, 1989

[30] Foreign Application Priority Data

May 19, 1988 [JP] Japan .................. 63-120663

[51] Int. Cl.$^5$ .......................... H04M 3/50
[52] U.S. Cl. .................... 379/266; 379/67; 379/309
[58] Field of Search ........... 379/266, 265, 309, 67, 379/88

[56] References Cited

U.S. PATENT DOCUMENTS 4,048,452  9/1977  Oehring et al. .................. 379/113
4,400,587  8/1983  Taylor et al. .................... 379/113

FOREIGN PATENT DOCUMENTS 0046224  2/1982  European Pat. Off. .......... 379/309
118290   9/1980  Japan .
0050691  5/1981  Japan ............................. 379/309

OTHER PUBLICATIONS

"No. 1 ESS Furnishes ACD Service", H. A. Lanty et al., *Bell Laboratories Record*, vol. 56, No. 3, Mar. 1978, pp. 76-82.
"Automatic Call Distribution Services in the Rolm CBX", L. J. Kanow, 1980 Int'l. Conf. on Communications, Seattle, Wash., Jun. 1980, pp. 19.4.1-19.4.7.
"GTD-1000 Digital PABX CAS Main/ACD", K. A. Tapper et al., *GTE Automatic Electric Journal*, Nov. 1980, pp. 182-193.

Primary Examiner—Thomas W. Brown
Attorney, Agent, or Firm—Staas & Halsey

[57] ABSTRACT

An automatic call distribution system includes a network-switch having a plurality of pilot extensions, a plurality of agents being split into a plurality of agent groups, trunks provided for each of the pilot extensions, and line circuits provided for each of the agents. The system also includes a memory which stores a route table provided for each of the pilot extensions. The route table defines some agent groups among the plurality of agent groups. The defined agent groups are to be connected to the related one of pilot extensions. A control circuit seeks an idle agent relating to the agent groups defined by the related one of the route tables, and establishes a route between the call and the sought idle agent through the related trunk, network switch, and line circuit.

30 Claims, 8 Drawing Sheets

| | | 16a |
|---|---|---|
| ROUTE STEP 1 | ANNOUNCEMENT |
| ROUTE STEP 2 | GROUP A |
| ROUTE STEP 3 | WAIT FOR TIME X1 |
| ROUTE STEP 4 | GROUP B |
| ROUTE STEP 5 | WAIT FOR TIME X2 |
| ROUTE STEP 6 | ROUTE TO ATTENDANT |

AUTOMATIC CALL DISTRIBUTION SYSTEM

BACKGROUND OF THE INVENTION

The present invention generally relates to an automatic call distribution system, and particularly to an automatic call distribution system capable of equally distributing incoming calls which terminate at a pilot extension provided in a private branch exchange, to agent extensions accommodated therein.

An automatic call distribution system is known in a system which equally distributes a number of incoming calls which terminate at a pilot extension provided in a private branch exchange, to agent extensions accommodated therein, so that call traffic is handled effectively and efficiently. A seat booking system for trains and airplanes is an application of the automatic call distribution system.

In a conventional call distribution system, when an automatic call distribution call (hereinafter simply referred to as an ACD call) terminates at a pilot extension which functions as a telephone number representative of a plurality of agents accommodated in a private branch exchange, the system automatically searches a first agent group for an idle agent (available agent). Generally, a plurality of agents are grouped. It is now assumed that two agent groups consisting of first and second agent groups are provided in the system. If the system finds an idle agent in the first agent group, the system connects the ACD call to the found idle agent. On the other hand, if the system cannot find any idle agent in the first agent group, the system couples the ACD call with an announcement machine. Thereby, the caller is provided with an appropriate announcement. Then, the system continues to search the first agent group for an idle agent. When the system finds no idle agent even after the lapse of a predetermined time, the system decides that the search is incomplete (a time out) and provides the caller with another announcement. It is noted that the above-mentioned announcements aim to let the caller know that the connection is being maintained and to reduce a number of intentional midway abandonments of ACD calls by the caller. Then, the system starts to seek an idle agent in the second agent group by referring to a route table which is permitted to be accessed only when the system can find no idle agent in the first agent group even after the lapse of the predetermined time.

In call distribution systems as described above, it is desired that the number of spontaneous midway abandonments be as small as possible, and that many ACD calls can be handled effectively and efficiently with a small number of agents. The above depends on users' requirements. Therefore, it is specifically required to arbitrarily design and modify the routing of ACD calls to the announcement machine and agents.

However, conventional call distribution systems have the following disadvantages. When an ACD call terminates at the above-mentioned pilot extension, the system automatically seeks an idle agent by searching the first agent group. It is to be noted that it is easy to design and construct the system so as to automatically search, without exception, the first agent group for an idle agent when an ACD call terminates at the pilot extension. However, such a procedure cannot satisfy a variety of users, needs. In other words, users desire that easy modification of routing of ACD calls be available. Even if users wish to modify the searching procedure in the conventional systems, it is actually difficult for the users to modify a related system program made by a manufacturer in accordance with any conventionally proposed procedure. From the above viewpoint, it may be said that the system is less flexible. Secondly, two different control procedures are required to seek an idle agent. That is, first, an idle agent in the first agent group is sought, and secondly, an idle agent in the second agent group is sought by referring to the route table when no idle agent can be found in the first agent group even after the predetermined time passes.

SUMMARY OF THE INVENTION

It is therefore a general object of the present invention to provide a novel and useful automatic call distribution system in which the above-mentioned disadvantages are eliminated.

A more specific object of the present invention is to provide an automatic call distribution system capable of arbitrarily and equally distributing ACD calls to any of a plurality of agent execution groups.

The above objects of the present invention are achieved by an automatic call distribution system comprising a network switch having a plurality of pilot extensions, a plurality of agents being grouped into a plurality of agent groups, trunks which are provided for each of the pilot extensions and connected to the network switch for receiving a call terminating at a related one of the pilot extensions, and line circuits which are provided for each of the agents and connected to the network switch for coupling the related individual agent to the network switch. Further, there is provided a memory and a control circuit. The memory stores a route table provided for each of the pilot extensions. The route table defines some agent groups among the plurality of agent groups. The defined agent groups are to be connected to the related one of the pilot extensions. The control circuit is connected to the trunks, the network switch, and the line circuits. The control circuit seeks an idle agent relating to the agent groups defined by the related one of the route tables and establishes a route between the call and the sought idle agent through the related trunk, network switch, and line circuit.

The above objects of the present invention will become apparent from the following detailed description when read in conjunction with the accompanying drawings.

DETAILED DESCRIPTION

A description is how given of a conventional automatic call distribution system in order to facilitate the understanding of the present invention.

Figure 1:
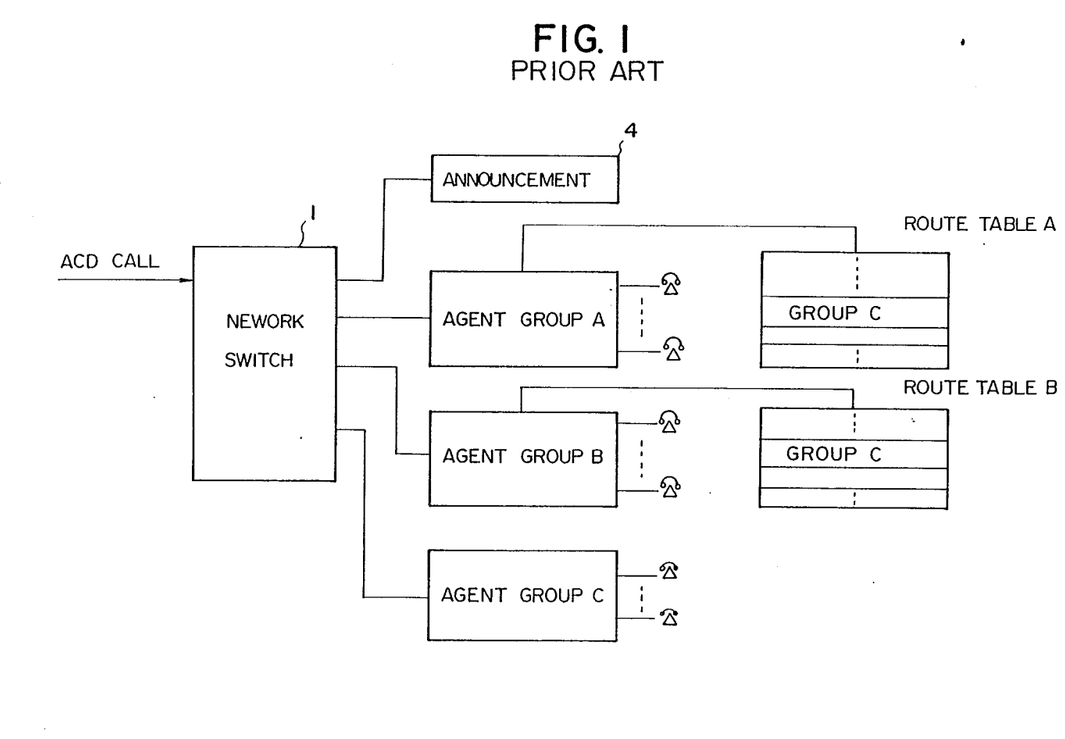
FIG. 1 is a schematic block diagram of a conventional automatic call distribution system.

Referring to FIG. 1, there is schematically illustrated a conventional automatic call distribution system. Pilot extensions A and B (FIG. 2) are provided in an automatic call distribution system including a network switch 1. Each of the pilot extensions A and B corresponds to a telephone number representative of a plurality of agents. Actually, each of the pilot extensions A and B is provided for a respective trunk (not shown), which trunk, in turn, accommodates a plurality of telephone lines. The system includes first agent groups A and B each comprising a plurality of agents, and a second agent group C comprising a plurality of agents, which are connected to the network switch 1. The system includes route tables A and B associated with the first agent groups A and B, respectively. An announcement machine 4 is coupled to the network switch 1.

Figure 2:
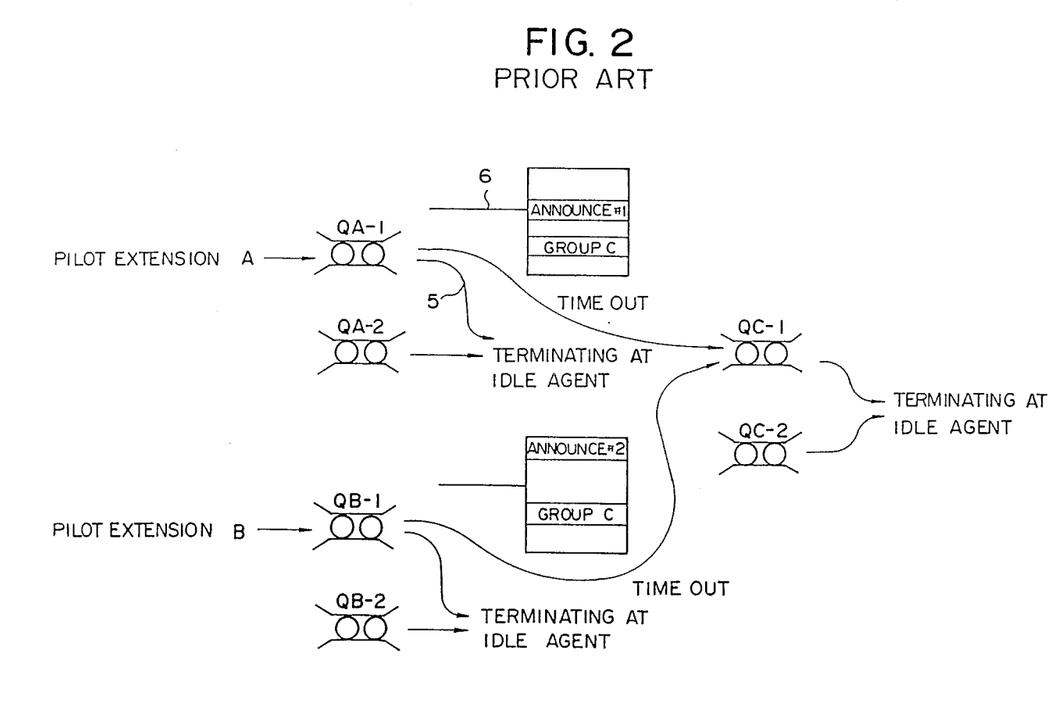
FIG. 2, is a diagram illustrating the procedure of a conventional automatic call distribution.

FIG. 2 illustrates the procedure of a conventional automatic call distribution. Referring to FIG. 2, when an ACD call terminates at the pilot extension A, the terminating ACD call is attached to a terminating ACD call queue QA-1 relating to the first agent group A. Then, the system automatically searches the first agent group A for an idle agent by referring to an idle agent queue QA-2 relating to the first agent group A. This is based on such a design that the pilot extension A is absolutely associated with the first agent group A. For example, it is impossible to connect an ACD call terminating at the pilot extension A to another, first agent group B. When an idle agent is found in the first agent group A by searching the idle agent queue QA-2, the system connects the ACD call to the found idle agent through the network switch 1, as indicated by a reference numeral 5. On the other hand, when there is no idle agent in the first agent group A, the route table A is looked up as indicated by a reference numeral 6. Then, the system executes route steps defined in the route table A. The route table A defines an announcement step in the beginning of the ACD control procedure. Thereafter, if all the agents in the first agent group A are still busy even after a predetermined time from the start of the search (that is, the search times out), the step of searching the second agent group C is read from the route table A. Then the system attaches the ACD call to a terminating ACD call queue QC-1 relating to the second agent group C as indicated by reference numeral 7 and seeks an idle agent in the second agent group C by referring to an idle agent queue QC-2 relating to the second agent group C. If there is an idle agent in the second group C, the ACD call which terminates at the pilot extension A is connected to the above idle agent.

When an ACD call terminates at the pilot extension B, the system operates in the same way as in the case where the ACD call terminates at the pilot extension A. A terminating ACD call queue QB-1 and an idle agent queue QB-2 are provided for the pilot extension B. A route table B is provided for the first agent group B. The ACD call which terminates at the pilot extension B is attached to the terminating ACD call queue QB-1, and it is determined whether or not an idle agent exists in the first agent group B by referring to the idle agent queue QB-2. If an idle agent in the first agent group B is available, the system connects the ACD call thereto. On the other hand, if all the agents of the first agent group B are still busy even after the lapse of a predetermined time, the ACD call is attached to the ACD call queue QC-1 relating to the second agent group C.

However, the above-mentioned conventional automatic call distribution system has the disadvantages described below. ACD calls which terminate at the pilot extension A are attached at the terminating ACD call queue QA-1 relating to the first agent group A without exception. That is, the first agent group A is first searched. This means that with the above-mentioned structure, it is impossible for ACD calls terminating at the pilot extension A to be connected to the first agent group B. Therefore, the system is not flexible.

Moreover, the system is not designed for taking account of users' modifications of the relationship between the pilot extensions A, B and the agent groups A, B to be first accessed. This relationship is absolutely defined in a system program which is generally handled only by manufacturers. For example, high expertise is required to modify the system so as to connect ACD calls terminating at the pilot extension A to the first agent group B. Therefore, it is difficult to satisfy a variety of users' needs.

Further, two different control procedures are required to connect the ACD calls to an idle agent. That is, different control procedures are required to search the idle agent queues QA-2 and QB-2 relating to the first agent groups A and B, and to search the idle agent queue QC-2 relating to the second agent group C.

Figure 3:
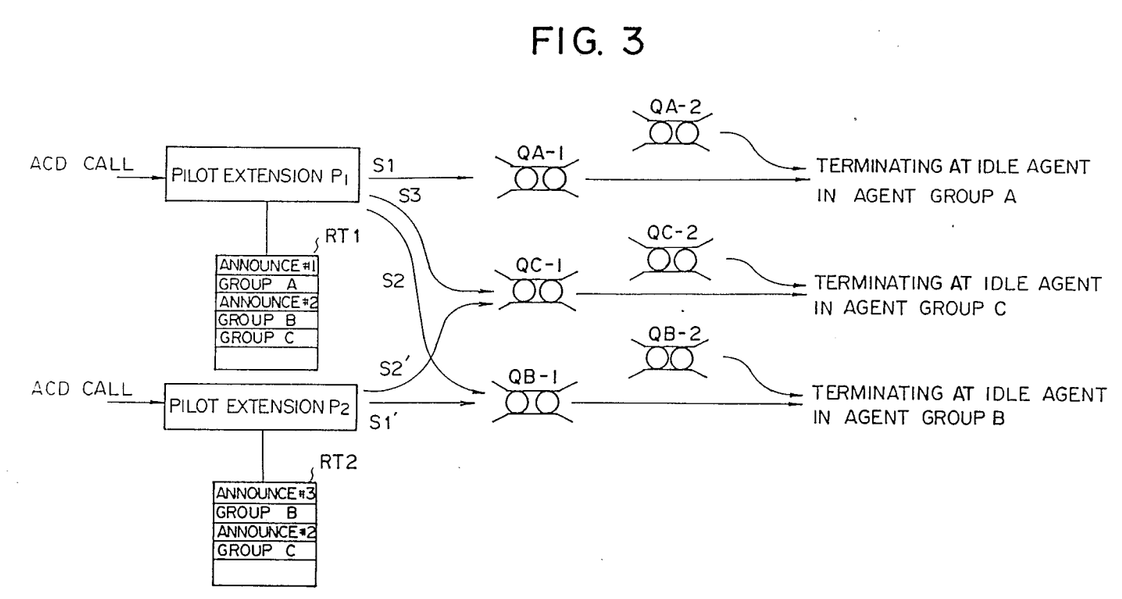
FIG. 3 is a diagram illustrating the principles of the present invention.

A description is given of the principles of the present invention with reference to FIG. 3. An essential feature of the present invention is that a route table is provided for each pilot extension. Referring to FIG. 3, a route table RT1 is provided for a pilot extension P1, and a route table RT2 is provided for a pilot extension P2. In other words, the route tables RT1 and RT2 are provided, independently of the agent groups A, B and C. The contents of the route tables RT1 and RT2 define the routing of ACD calls terminating at the pilot extensions P1 and P2, respectively. Therefore, it is possible to connect an ACD call terminating at the pilot extension P1 to any one of the agent groups. A terminating ACD call queue is provided for each of the pilot extensions P1 and P2. It is noted that the terminating ACD call queue provided for each of the pilot extensions P1 and P2 is not separately illustrated in FIG. 3, but instead is illustrated in the form of separated terminating ACD call queues QA-1, QB-1 and QC-1 for the agent groups A, B and C for convenience' sake. All ACD calls which terminate at the pilot extensions P1 and P2, are connected to the corresponding terminating ACD call queues. The route tables RT1 and RT2 are formed in a main memory, which is controlled by a central processing unit.

When an ACD call terminates at the pilot extension P1, the ACD call is connected to the terminating ACD call queue related to the pilot extension P1. Then the first executing route step of the program in the route table RT1 is read. In the illustrated case, the first route step is a program used to provide the caller with announcement #1. After the first route step is executed, the second route step in the route table RT1 is read and executed. This is substantially equivalent to a process such that the ACD call is connected to the terminating ACD call queue QA-1 for the agent group A. The second route step relates to the search for an idle agent in the agent group A. It is to be noted that the search for an idle agent in the group A is not activated until the related route step in the route table RT1 is read. On the other hand, in the conventional procedure, an idle agent in the group A is automatically sought when an ACD call terminates at the pilot extension A.

By reading the route step relating to the search for an idle agent in the agent group A, an idle agent queue A relating to the agent group A is referred to. If an idle agent in the agent group A is available, the ACD call is connected to the idle agent, and the present idle agent is detached from the idle agent queue QA-2. The above-mentioned procedure is indicated by a reference S1.

On the other hand, if no available idle agent can be found even after the lapse of a predetermined time, the third route step relating to announcement #2 in the route table RT1 is read and executed. After the announcement #2 is supplied to the caller, the fourth route step in the route table RT1 is read. The fourth route step relates to the agent group B. By executing the fourth route step, an idle agent in the idle agent queue QB-2 for the agent group B is sought. This is substantially equivalent to a procedure such that the ACD call is connected to the terminating ACD call queue QB-1 and then an idle agent in the agent group B is sought by searching the idle agent queue QB-2 for the agent group B. According to the present invention, the search for an idle agent in the agent group B may be carried out in place of the search for an idle agent in the agent group A, and in the alternative, may be carried out together with the search for an idle agent in the agent group A. The above-mentioned procedure subsequent to the procedure S1 is indicated by a reference S2.

Then if no idle agent in the agent group B or the groups A and B becomes available even after the lapse of a predetermined time, the fifth route step in the route table RT1 is read and executed. The fifth route step relates to the agent group C. In this case, the search for an idle agent in the agent group C may be employed in place of the search for an idle agent in the agent groups A and B, and in the alternative, may be carried out in addition to the search for an idle agent in the agent groups A and B. This procedure following the procedure S2 is indicated by a reference S3.

On the other hand, when an ACD call terminates at the pilot extension P2, route steps defined in the related route table RT2 are sequentially read and executed in the same way as those for the ACD call terminating at the pilot extension P1. In the illustrated route table RT2, route steps relating to the agent groups B and C are defined. Therefore, an idle agent in the agent group B is first sought as indicated by a reference S1'. Then if all the agents in the group B are still busy even after the lapse of a predetermined time, an idle agent in the agent group C is sought, as indicated by a reference S2'.

In the above-described manner, the correspondence between the route tables RT1, RT2, and the agent groups A, B, C are not established until the related corresponding route steps defined in the route tables are read and executed. The routing of the automatic call distribution can be modified with ease by modifying the contents of the route tables RT1 and RT2.

Figure 4:
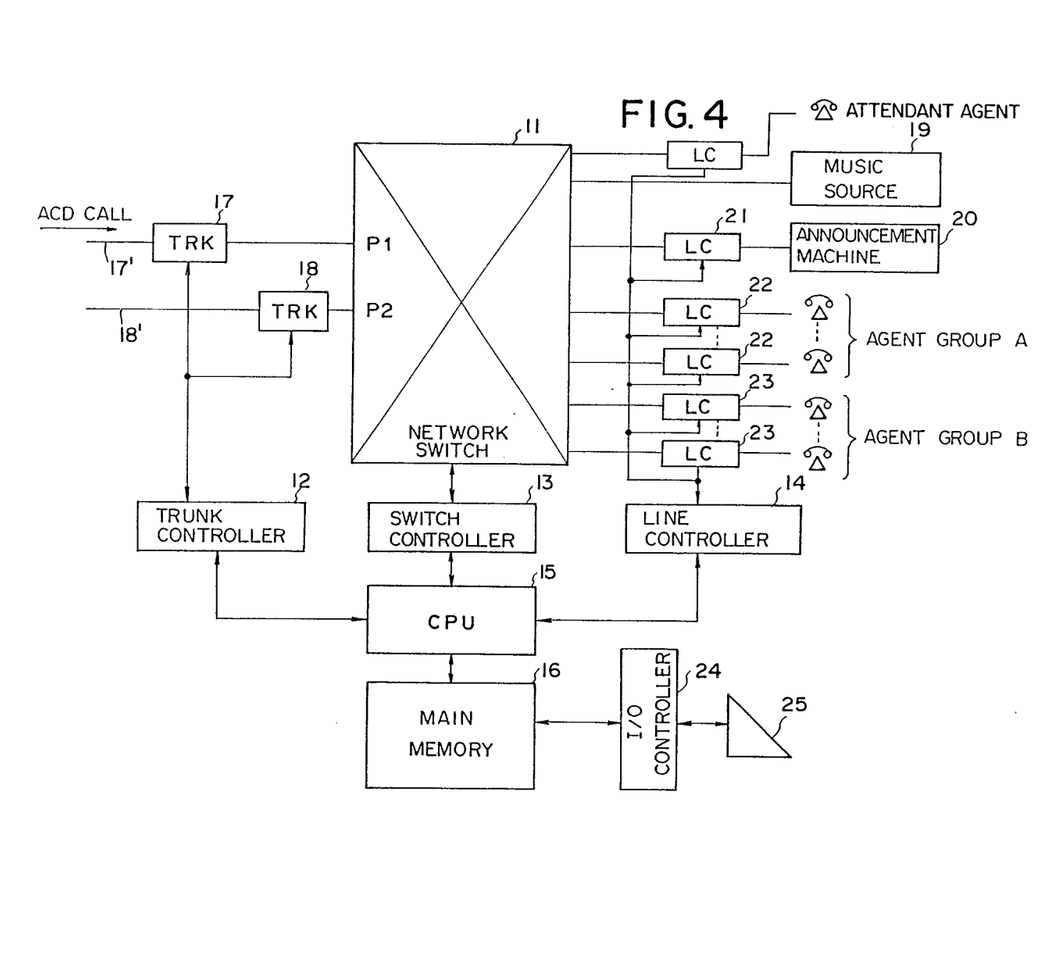
FIG. 4 is a block diagram of a preferred embodiment of the present invention.

A description is given of a preferred embodiment of the present invention. Referring to FIG. 4, there is illustrated an automatic call distribution system of the preferred embodiment of the present invention. The illustrated automatic call distribution system includes a network switch 11, a trunk controller 12, a switch controller 13, a line controller 14, a central processing unit (hereinafter simply referred to as a CPU) 15, and a main memory 16. Trunks (TRK) 17 and 18 are connected to the network switch 11. A plurality of lines are connected to each of the trunks 17 and 18. In FIG. 4, only one line (17' and 18', respectively) is illustrated for each of the trunks 17 and 18 for convenience' sake. The trunks 17 and 18 are assigned individual pilot extension numbers P1 and P2. The trunk controller 12 controls the trunks 17 and 18 as described later.

A music source 19 for providing a caller with music is connected to the network switch 11. An announcement machine 20 is coupled to the network switch 11 through a line circuit (LC) 21. The announcement machine 20 provides a caller with an appropriate announcement. An agent group A comprising a plurality of agents is coupled to the network switch 11 through related line circuits 22. Similarly, an agent group B comprising a plurality of agents is coupled to the network switch 11 through related line circuits 23. The line controller 14 controls the line circuits 21, 22 and 23, as will be described later. The CPU 15 controls the trunk controller 12, the switch controller 13, and the line controller 14, as will be described later. The CPU 15 also controls the read/write operation with respect to the main memory 16. The switch controller 13 controls the net work switch 11 so as to connect and disconnect the trunks 17 and 18 to and from the line circuits 21-23 and the music source 19. A maintenance console 25 is coupled with the main memory 16 through an input-/output controller (hereinafter simply referred to as an I/0 controller) 24.

Figure 5:
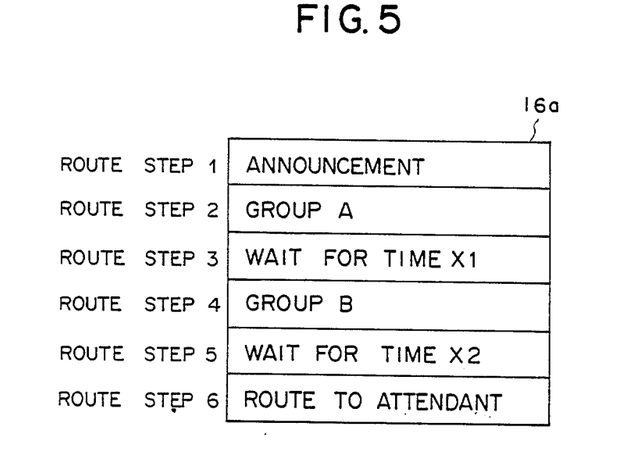
FIG. 5 illustrates a route table formed in a main memory in the system shown in FIG. 4.

The main memory 16 stores a route table 16a for each of pilot extensions P1 and P2 (or the trunks 17 and 18), as shown in FIG. 5. The illustrated route table 16a relates to the pilot extension Pl, and includes six route steps. Route step 1 is a step of providing a caller related to the trunk 17 with an appropriate announcement such that "This is XYZ corporation; Please wait for a while". Route step 2 relates to the search for an idle agent in the agent group A. Route step 3 relates to a step of defining waiting time X1 during which the search for an idle agent in the agent group A is repeatedly carried out. Route step 4 is a step of searching the agent group B for an idle agent when no idle agent becomes available in the agent group A even after the lapse of waiting time XI. Route step 5 is a step of defining waiting time X2 during which the search for an idle agent in the agent group B is repeatedly carried out. The search for an idle agent in the agent group B may be carried out in place of or together with the search for an idle agent in the agent group A. Route step 6 is a step of routing the ACD call to an attendant agent when route steps 2 to 5 fail to find an idle agent in both of the agent groups A and B.

The contents of each of the route tables 16a can be revised by the maintenance console 25 through the I/0 controller 24.

Figure 6:
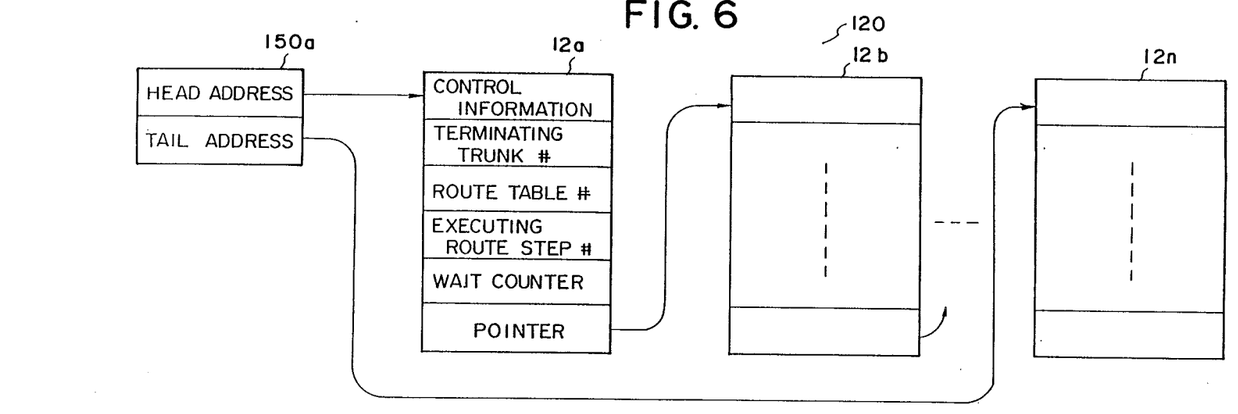
FIG. 6 illustrates a queue of terminating ACD calls formed in the main memory.

In the main memory 16, a queue 120 of terminating ACD calls as illustrated in FIG. 6 is formed by using information supplied from the trunk controller 12 and the CPU 15. The terminating ACD call queue 120 is formed for each of the trunks 17 and 18, or the pilot extensions P1 and P2. A call data buffer 12a, 12b, . . . , 12n is generated for each ACD call which terminates at the related trunk, and is chained together so as to form the terminating ACD call queue 120. The CPU 15 has a pointer 150a, which manages a head address and a tail address of the ACD call terminating queue 120. The head address indicates the call data buffer 12a in the head of the terminating ACD call queue 120, and the tail address indicates the call data buffer 12n at the tail thereof. Each call data buffer 12a, 12b, . . . , 12n includes information on a terminating trunk number, a route table number, an executing route step number, a wait counter, and a pointer. Generally, the top of each call data buffer stores conventional control information such as a dial-in number in addition to the information described below. The terminating trunk number subsequent to the control information indicates the trunk at which an ACD call terminates. The route table number indicates a route table assigned to the pilot extensions P1 and P2 at which an ACD call terminates. As will be described later, an individual route table provided for each of the pilot extensions P1 and P2 is stored in the main memory 16. The executing route step number indicates a route step being processed which is defined in the related route table. The wait counter is a program counter which counts waiting times X1 and X2. The pointer is indicative of the top address of the next attached call data buffer. For example, the pointer of the call data buffer 12a indicates the top address of the call data buffer 12b.

Figure 7:
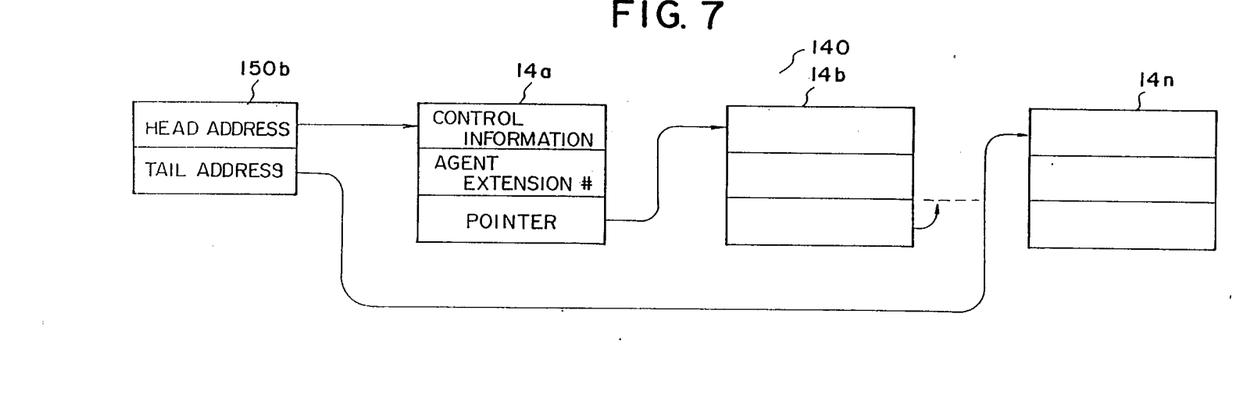
FIG. 7 illustrates a queue of idle agents formed in the main memory.

An idle agent queue 140 as shown in FIG. 7 is formed in the main memory 16 by using information supplied from the line controller 14 and the CPU 15. One idle agent queue 140 is formed for one agent group. In the illustrated system structure of FIG. 4, a respective, individual idle agent queue 140 is formed for each of the agent groups A and B. The idle agent queue 140 includes an idle agent buffer 14a, 14b, . . . , 14n. A respective, individual idle agent buffer is formed for each of the idle agents in the related agent group. The CPU 15 has a pointer 150b, which manages a head address and a tail address. The head address indicates the idle agent buffer 14a at the head of the idle agent queue 140, and the tail address indicates the idle agent buffer 14n at the tail thereof. Each of the idle agent buffers 14a, 14b, . . . , 14n includes information on an agent extension number and a pointer in addition to conventional control information relating to a corresponding one of the line circuits 21 to 23. The agent extension number (hereinafter simply referred to as an agent number) indicates an individual, idle agent in the related agent group. The pointer indicates the top address of the next idle agent buffer attached to the idle agent buffer of concern.

Figure 8A:
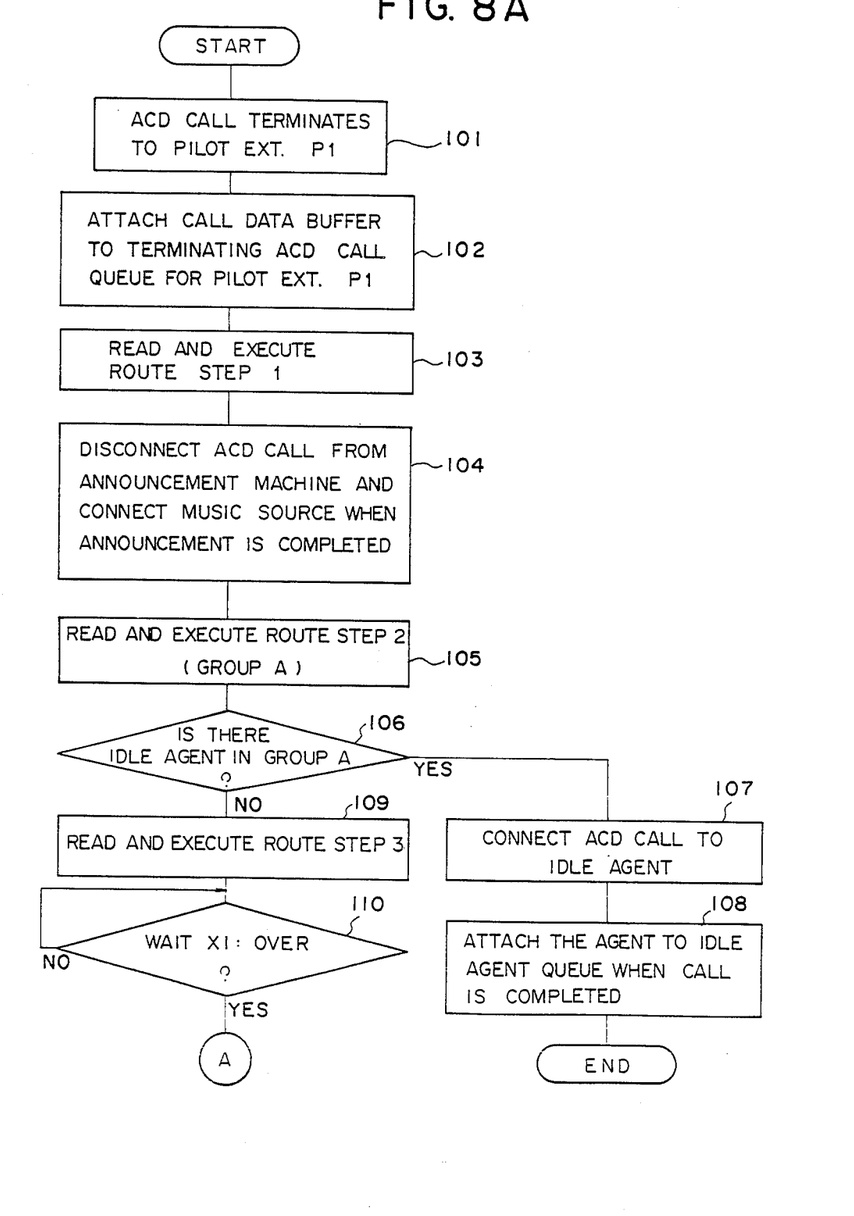
FIG. 8A and 8B are flowcharts illustrating the procedure of the automatic call distribution of the embodiment.
Figure 8B:
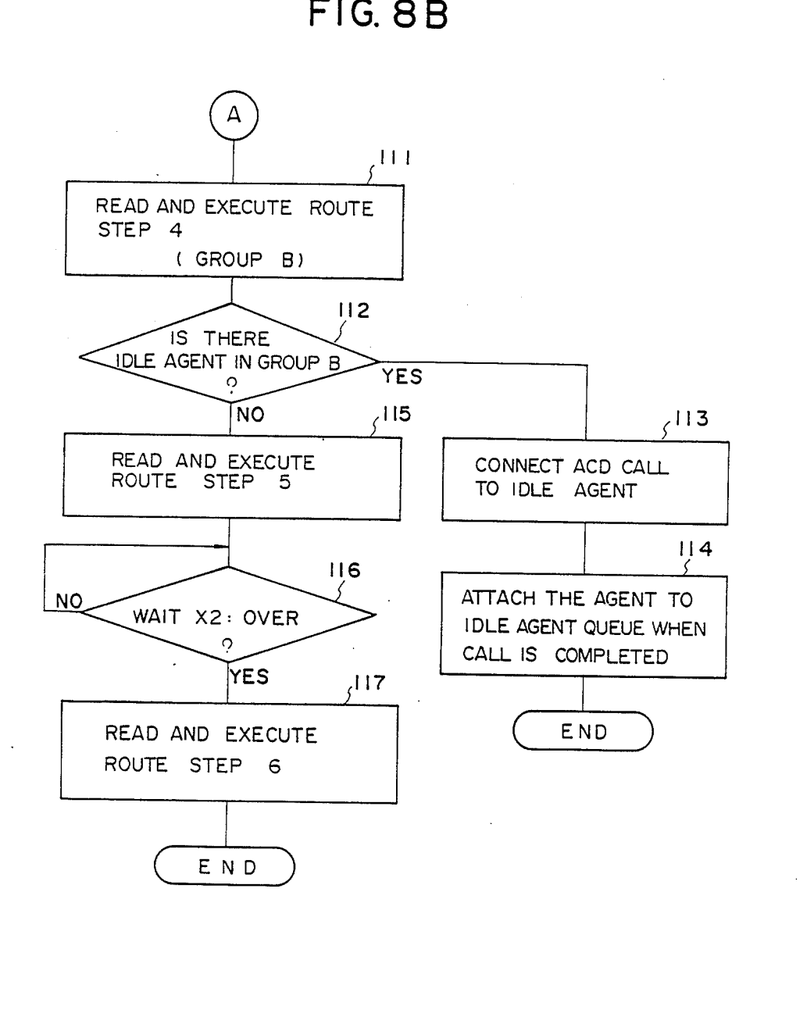

A description is given of the operation of the embodiment with reference to FIGS. 8A and 8B, which are flowcharts showing the ACD call process. It is now assumed that an ACD call terminates at the pilot extension P1 through the trunk 17 (i.e., see FIG. 4 and step 101 in FIG. 8A). At this time, the trunk controller 12 knows that the ACD call terminates at the pilot extension P1 through the trunk 17 by receiving the related control information supplied from the trunk 17, such as the terminating trunk number. The control information is supplied to the CPU 15 from the trunk controller 12. Then, the CPU 15 generates a call data buffer for the terminating ACD call, and attaches it to the end of the terminating ACD call queue 120 for the pilot extension P1 formed in the main memory 16 (step 102). At this time, the tail address is revised. The CPU 15 can obtain the route table number related to the terminating ACD call by knowing the terminating trunk number. The obtained route table number is stored in the generated call data buffer for terminating the ACD call.

Then, the CPU 15 reads route step 1 from the route table 16a (FIG. 5) for the trunk 17, and executes route step 1 (step 103). As described previously, route step 1 is to provide the caller with an appropriate announcement. The CPU 15 controls the switch controller 13 and the line controller 14 so that the terminating ACD call is connected to the announcement machine 20. Thereby, the caller is supplied with the announcement. When the announcement is completed, the CPU controls the switch controller 13 and the line circuit 21 so that the ACD call is disconnected from the announcement machine 20 and connected to the music source (step 104). This aims to let the caller know that the line is being maintained.

Thereafter, the CPU 15 reads route step 2 from the related route table 16a and executes the same (step 105). Then, the CPU 15 begins to seek an idle agent in the idle agent queue 140 for the agent group A relating to the pilot extension P1 or the trunk 17. The CPU 15 is informed, by the line controller 14, of the agent extension number when the related agent is released from the busy state and becomes idle. In this manner, the idle agent queue 140 as shown in FIG. 7 is formed in the main memory 16. Then, the CPU 15 determines whether or not an idle agent in the agent group A is available (step 106). When the result in step 105 is affirmative, the CPU 15 controls the switch controller 13 and the line controller 14 so that the terminating ACD call is connected to the found idle agent in the agent group (step 107). At this time, the call data buffer relating to the connected ACD call is detached from the terminating ACD call queue 120 for the pilot extension P1 shown in FIG. 6, and also the idle agent buffer relating to the connected ACD call is detached from the idle agent buffer queue 140 for the agent group A shown in FIG. 7. Thereafter, when the ACD call is completed, the related agent is attached, as an idle agent, to the idle agent queue 140 for the agent group A. It is noted that after step 105 is executed once, the CPU 15 seeks an idle agent in the agent group A whenever an idle agent is attached to the idle agent queue 140 shown in FIG. 7 due to the completion of conversation (communication) with respect to another terminating ACD call.

On the other hand, if the result in step 106 is negative, the CPU 15 reads route step 3 from the route table 16a of FIG. 5, and executes the same (step 109). Route step 3 defines waiting time X1 necessary for the CPU 15 to start to seek an idle agent in the agent group B together with the search for an idle agent in the agent group A. When the CPU 15 finds no idle agent in the agent group A after waiting time X1 (step 110), the CPU 15 reads route step 4 from the route table 16a and executes the same (step 111 in FIG. 8B). Thereby, the CPU 15 starts to seek an idle agent in not only the agent group A but also the agent group B. It is noted that after step 111 is executed once, the CPU 15 seeks an idle agent in the idle agent queue 140 for the agent group B whenever an agent is attached to the idle agent queue 140 due to the completion of conversation with respect to another terminating ACD call. Then, the CPU 15 executes step 112. If an idle agent in the agent group B is available in step 112, the CPU 15 controls the switch controller 13 and the line controller 14 so as to connect the ACD call to the found idle agent (step 113). At this time, the call data buffer relating to the connected ACD call is detached from the terminating ACD call queue 120 shown in FIG. 6, and also the connected agent is detached from the idle agent queue 140 shown in FIG. 7. Thereafter, when the ACD call is completed, the CPU 15 attaches the related agent, as an idle agent, to the idle agent queue 140 for the agent group B.

On the other hand, when the result in step 112 is negative, the CPU 15 reads route step 5 from the route table 16a for the pilot extension P1, and executes the same (step 115). Route step 5 defines waiting time X2 necessary for the CPU 15 to read and execute the following route step. That is, when the CPU 15 finds no idle agent in both the agent groups A and B for waiting time X2, the procedure proceeds to step 117. In step 117, the CPU 15 reads route step 6 from the route table 16a, and executes the same. Thereby, the ACD call is routed to an attendant agent, which is connected to the network switch 11 (FIG. 4) through a line circuit (not shown for convenience' sake) in the same way as the agent groups A and B. Then, the automatic call distribution control ends. Thereby, a route connecting between the ACD call and one agent related to the pilot extension P1 is established.

In an alternative, it is possible to seek an idle agent in the agent group B in place of searches for an idle agent in the agent group A when the CPU 15 finds no idle agent in the agent group A even after waiting time X1 passes. It is also possible to provide more than two pilot extension numbers (trunks) and more than two agent groups. Of course, one route table is provided for each of the pilot extensions. In the above-described embodiment, an ACD call which terminates to the pilot extension P2 is processed in the same way as the ACD call terminating to the pilot extension P1.

The present invention is not limited to the specifically disclosed embodiment, and variations and modifications may be made without departing from the scope of the invention.

What is claimed is:

1. An automatic call distribution system comprising:
a network switch having a plurality of pilot extensions;
a plurality of agents split into a plurality of agent groups;
trunk means, provided for each of said pilot extensions and connected to said network switch, for receiving a call terminating at a related one of said pilot extensions;
line circuit means, provided for each of said agents and connected to said network switch, for coupling a related one of said agents to said network switch;
memory means for storing a route table provided for each of said pilot extensions, said route table defining some agent groups among said plurality of agent groups to be connected to a corresponding one of said pilot extensions; and
control means, coupled to said trunk means, said network switch, said line circuit means, and said memory means, for seeking an idle agent relating to said agent groups defined by the corresponding one of said route tables and for establishing a route between said call and said sought idle agent through said trunk means, said network switch, and said line circuit means.

2. An automatic call distribution system as claimed in claim 1, wherein said route table provided for each of said pilot extensions includes information on a sequence of search of said agent groups defined in said related route table for seeking an idle agent, and said control means seeks an idle agent for every agent group in accordance to said sequence.

3. An automatic call distribution system as claimed in claim 1, wherein when said control means finds no idle agent in one of said agent groups defined in said related route table even after the lapse of a predetermined time, said control means starts to seek an idle agent in another one of said agent groups.

4. An automatic call distribution system as claimed in claim 1, wherein when said control means finds no idle agent in one of said agent groups defined in said related route table even after the lapse of a predetermined time, said control means starts to seek an idle agent in another related agent group together with the preceding search for an idle agent in said one agent group.

5. An automatic call distribution system as claimed in claim 1, wherein when said control means finds no idle agent in one of said agent groups defined in said related route table even after the lapse of a predetermined time, said control means starts to seek an idle agent in another related agent group in place of the preceding search for an idle agent in said one agent group.

6. An automatic call distribution system as claimed in claim 3, wherein said predetermined time is defined in said route table.

7. An automatic call distribution system as claimed in claim 1, further comprising revising means, connected to said memory means, for revising the contents of said route table formed in said memory means.

8. An automatic call distribution system as claimed in claim 7, wherein said revising means includes human-operative input means for inputting information relating to a change of agent groups to be searched for each of said route tables.

9. An automatic call distribution systems as claimed in claim 1, further comprising announcement providing means for providing a caller of said call with an announcement for letting the caller know that the call is being maintained, and line circuit means for connecting said announcement providing means to said network switch, wherein said control means comprises means for controlling said network switch and said line circuit means so as to connect said call to said announcement providing means when said call fails to terminate at one of the pilot extensions, and thereafter said control means starts to seek an idle agent in the agent groups defined by the corresponding one of said route tables.

10. An automatic call distribution system as claimed in claim 9, wherein said route table provided for each of said pilot extensions comprises an instruction which instructs said control means to connect said call to said announcement providing means, and wherein said control means reads said instruction from said route table and executes the same when said call terminates at one of said pilot extensions.

11. An automatic call distribution system as claimed in claim 1, further comprising music source means, connected to said network switch, for supplying the person making said call with music during the time when said control means seeks an idle agent in the agent groups defined by the corresponding one of said route tables, thereby letting said person know that the call is being maintained.

12. An automatic call distribution system as claimed in claim 11, wherein said route table provided for each of said pilot extensions comprises an instruction which instructs said control means to connect said call to said music source means, and wherein said control means reads said instruction from said route table and executes the same so as to supply said person with said music.

13. An automatic call distribution system as claimed in claim 1, wherein said control means comprises terminating call queuing means for generating a terminating call queue indicative of one or more calls which terminate at one of said pilot extensions and for detaching, from said terminating call queue, a call for which an idle agent is found, and wherein said control means seeks an idle agent for each of said one or more calls in said terminating call queue.

14. An automatic call distribution system as claimed in claim 13, wherein said terminating call queuing means generates said terminating call queue for each of said pilot extensions.

15. An automatic call distribution system as claimed in claim 13, wherein said terminating call queuing means generates said terminating call queue so that said one or more calls in said terminating call queue are coupled in series.

16. An automatic call distribution system as claimed in claim 13, wherein said terminating call queue is formed in said memory means.

17. An automatic call distribution system as claimed in claim 13, wherein said terminating call queue includes a call data buffer formed for each terminating call.

18. An automatic call distribution system as claimed in claim 17, wherein said call data buffer includes information on a terminating trunk number indicative of one of said trunks at which said call terminates, and a route table number indicative of one of said route tables relating to said terminating trunk number.

19. An automatic call distribution system as claimed in claim 15, wherein said control means includes a head address pointer indicative of one of said terminating calls located in the head of the terminating call queue, and a tail address pointer indicative of one of said terminating calls located at the tail of said terminating call queue.

20. An automatic call distribution system as claimed in claim 1, wherein said control means comprises idle agent queuing means for generating an idle agent queue indicative of one or more idle agents for each of said agent groups and for detaching, from said idle agent queue, an idle agent which becomes busy, and wherein said control means seeks an idle agent by referring to said idle agent queue for said related one of agent groups.

21. An automatic call distribution system as claimed in claim 20, wherein said terminating call queuing means generates said terminating call queue so that said one or more idle agents in said idle agent queue are coupled in series.

22. An automatic call distribution system as claimed in claim 20, wherein said idle agent queue formed for each of said agent groups is formed in said memory means.

23. An automatic call distribution system as claimed in claim 20, wherein said idle agent queue includes an idle agent buffer formed for each of said idle agents.

24. An automatic call distribution system as claimed in claim 23, wherein said idle agent buffer includes information on an agent number indicative of an idle agent in the related agent group.

25. An automatic call distribution system as claimed in claim 23, wherein said control means includes a head address pointer indicative of one of said idle agents located in the head of said idle agent queue, and a tail address pointer indicative of one of said idle agents located at the tail of said idle agent queue.

26. An automatic call distribution system as claimed in claim 1, further comprising an attendant agent connected to said network switch, wherein when no idle agent becomes available in all the related agent groups, said control means establishes a route between said terminating call and said attendant agent.

27. An automatic call distribution system as claimed in claim 26, wherein said route table formed for each of said pilot extensions includes an instruction which instructs said control means to connect said terminating call to said attendant agent.

28. An automatic call distribution system as claimed in claim 1, wherein said control means comprises a central processing unit.

29. An automatic call distribution system as claimed in claim 1, wherein each of said trunk means accommodates a plurality of telephone lines which terminate at said related one of said pilot extensions.

30. An automatic call distribution system as claimed in claim 1, wherein each of said pilot extensions corresponds to a telephone number representative of said agent groups defined in said related route table.

* * * * *

UNITED STATES PATENT AND TRADEMARK OFFICE
CERTIFICATE OF CORRECTION

PATENT NO. : 4,951,310

DATED : Aug. 21, 1990

INVENTOR(S) : HONDA et al.

It is certified that error appears in the above-identified patent and that said Letters Patent is hereby corrected as shown below:

FRONT PAGE:

[56] OTHER PUBLICATIONS, please include --"Glossary of Terminology," The Marketing Programs and Services Group, 1983--.

Col. 1, line 66, change "users," to --users'--.

Col. 2, line 66, change "FIG." to --FIGS.--.

Col. 3, line 3, change "how" to --now--.

Col. 4, line 40, delete ";".

Col. 6, line 27, change "net work" to --network--;
line 36, change "Pl" to --P1--;
line 47, change "XI" to --X1--.

Col. 7, line 17, delete ":".

Col. 9, lines 29 and 31, change "to" to --at--.

UNITED STATES PATENT AND TRADEMARK OFFICE
CERTIFICATE OF CORRECTION

PATENT NO. : 4,951,310

DATED : August 21, 1990

INVENTOR(S) : Honda, et al.

It is certified that error appears in the above-identified patent and that said Letters Patent is hereby corrected as shown below:

Col. 9, lines 29 and 31, change "to" to --at--.

Signed and Sealed this

Twenty-eighth Day of April, 1992

Attest:

HARRY F. MANBECK, JR.

*Attesting Officer*     *Commissioner of Patents and Trademarks*